(12) United States Patent
Tsuji et al.

(10) Patent No.: US 10,266,714 B2
(45) Date of Patent: Apr. 23, 2019

(54) AQUEOUS INK, INK CARTRIDGE AND INK JET RECORDING METHOD

(71) Applicant: CANON KABUSHIKI KAISHA, Tokyo (JP)

(72) Inventors: Itaru Tsuji, Kawasaki (JP); Yuki Nishino, Inagi (JP); Kousuke Yamasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/912,947

(22) Filed: Mar. 6, 2018

(65) Prior Publication Data

US 2018/0258303 A1 Sep. 13, 2018

(30) Foreign Application Priority Data

Mar. 10, 2017 (JP) ................... 2017-045709

(51) Int. Cl.
*C09D 11/38* (2014.01)
*C09D 11/322* (2014.01)
*C09D 11/102* (2014.01)
*B41M 5/00* (2006.01)
*C09D 11/037* (2014.01)
*B41J 2/175* (2006.01)
(Continued)

(52) U.S. Cl.
CPC ............ *C09D 11/38* (2013.01); *B41J 2/1752* (2013.01); *B41J 2/1753* (2013.01); *B41J 2/17503* (2013.01); *B41J 2/17513* (2013.01); *B41J 2/17553* (2013.01); *B41J 29/02* (2013.01); *B41M 5/0023* (2013.01); *C09D 11/033* (2013.01); *C09D 11/037* (2013.01); *C09D 11/102* (2013.01); *C09D 11/322* (2013.01)

(58) Field of Classification Search
CPC .. B41J 2/17503; B41J 2/17513; B41J 2/1752; B41J 2/1753; B41J 2/17553; B41J 29/02; C09D 11/38; C09D 11/033; B41M 5/0023
See application file for complete search history.

(56) References Cited

U.S. PATENT DOCUMENTS

| 6,737,449 B1 * | 5/2004 | Yatake ................. B41J 2/1606 106/31.6 |
| 7,244,299 B2 | 7/2007 | Tsuji et al. |
| 8,684,509 B2 | 4/2014 | Yamasaki et al. |

(Continued)

FOREIGN PATENT DOCUMENTS

| JP | 2012-214714 A | 11/2012 |
| JP | 2014-070205 A | 4/2014 |

*Primary Examiner* — Lamson Nguyen
(74) *Attorney, Agent, or Firm* — Venable LLP

(57) ABSTRACT

An aqueous ink used in an ink jet recording method that uses thermal energy to eject an ink from a recording head includes a copper phthalocyanine pigment and a urethane resin. The urethane resin has a unit derived from a polyisocyanate, a unit derived from a polyether polyol having no acid group, a unit derived from a polyol having an acid group and a unit derived from a polyamine; in the urethane resin, the proportion of the urethane bond relative to the total amount of the urethane bond and the urea bond derived from the polyamine is 90.0% by mole or more to 99.0% by mole or less; and the urethane resin has a weight-average molecular weight of 20,000 or less and an acid value of 50 mg KOH/g or more to 110 mg KOH/g or less.

8 Claims, 2 Drawing Sheets

(51) Int. Cl.
*C09D 11/033* (2014.01)
*B41J 29/02* (2006.01)

(56) References Cited

U.S. PATENT DOCUMENTS

| | | |
|---|---|---|
| 8,690,307 B2 | 4/2014 | Okumura et al. |
| 9,169,413 B2 | 10/2015 | Shiiba et al. |
| 9,243,155 B2 | 1/2016 | Okumura et al. |
| 9,452,608 B2 | 9/2016 | Okumura et al. |
| 9,499,704 B2 * | 11/2016 | Okumura ............. C09D 11/102 |
| 2012/0249663 A1 | 10/2012 | Okumura et al. |
| 2017/0210918 A1 * | 7/2017 | Masada ................ C09D 11/033 |

* cited by examiner ated image, a part where an ink does not adhere to an intended position is recognized as a low glossiness part, and the glossiness of images is likely to deteriorate.

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

In recent years, inks used for an ink jet recording method are required to enable the recording of images having excellent toughness (resistance against light, ozone gas, water and the like). On this account, an aqueous ink containing a pigment as a coloring material has been increasingly used. The aqueous ink containing a pigment is also required to enable the recording of images with high qualities comparable to silver halide photographs. A pigment ink containing a particulate pigment in an aqueous medium, however, may give recorded images having lower image characteristics such as glossiness than those of a dye ink containing a dye dissolved in an aqueous medium, in some cases. In order to improve the characteristics of images to be recorded and to improve ink characteristics such as ejection stability, a pigment ink containing a water-soluble urethane resin has been disclosed.

An ink containing a urethane resin having a weight-average molecular weight of 30,000 or more and a self-dispersible copper phthalocyanine pigment has been disclosed (Japanese Patent Application Laid-Open No. 2014-070205). An ink containing a urethane resin in which the molar ratio of the proportion of a urethane bond relative to the proportion of a urea bond is 85.0/15.0 or more to 100.0/0.0 or less has been disclosed (Japanese Patent Application Laid-Open No. 2012-214714).

SUMMARY OF THE INVENTION

The inventors of the present invention have studied inks containing a urethane resin. The study has shown that the glossiness of images is improved to some extent by adding the urethane resin, but it is difficult to record images having a high level of glossiness recently required.

It has also been revealed that when the ink containing a copper phthalocyanine pigment and a urethane resin disclosed in Japanese Patent Application Laid-Open No. 2014-070205 is ejected from an ink jet recording head that ejects an ink by thermal energy to record images, the ink ejection stability is gradually decreased. It has also been shown that there is still room for improvement in the ejection stability of the ink disclosed in Japanese Patent Application Laid-Open No. 2012-214714.

The present invention is intended to provide an aqueous ink having excellent ejection stability even after recording for a long time and enabling the recording of an image having excellent glossiness. The present invention is also intended to provide an ink cartridge including the aqueous ink and an ink jet recording method.

The above objects are achieved by the following present invention. In other words, the present invention provides an aqueous ink used in an ink jet recording method that uses thermal energy to eject an ink from a recording head, and the aqueous ink includes a copper phthalocyanine pigment and a urethane resin. The urethane resin has a unit derived from a polyisocyanate, a unit derived from a polyether polyol having no acid group, a unit derived from a polyol having an acid group and a unit derived from a polyamine, a proportion of a urethane bond relative to a total amount of the urethane bond and a urea bond derived from the polyamine is 90.0% by mole or more to 99.0% by mole or less, and the urethane resin has a weight-average molecular weight of 20,000 or less and an acid value of 50 mg KOH/g or more to 110 mg KOH/g or less.

According to the present invention, an aqueous ink having excellent ejection stability even after recording for a long time and enabling the recording of an image having excellent glossiness can be provided. According to the present invention, an ink cartridge including the ink and an ink jet recording method can also be provided.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
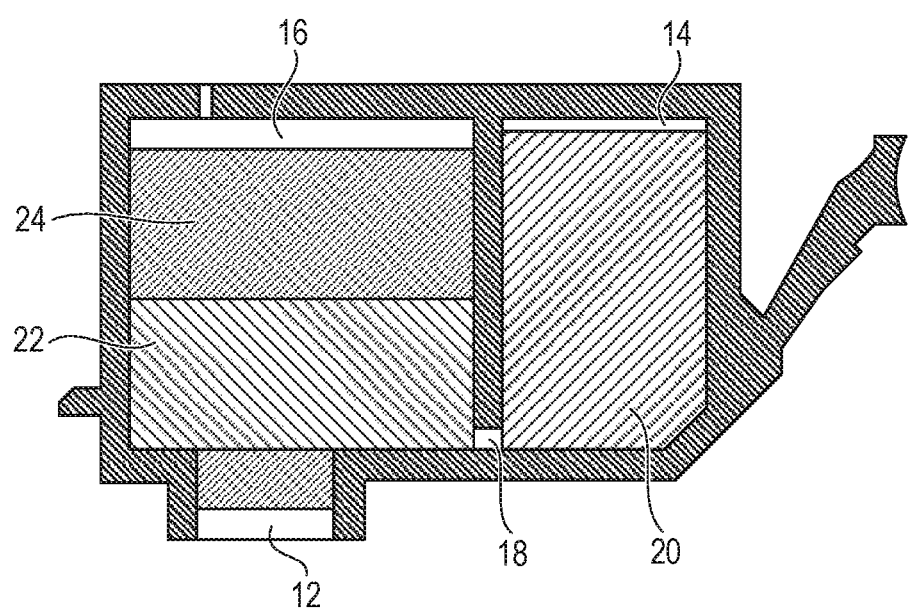
FIG. 1 is a schematic sectional view showing an embodiment of an ink cartridge of the present invention.

Preferred embodiments of the present invention will now be described in detail in accordance with the accompanying drawings.

The present invention will now be described in detail with reference to preferred embodiments. In the present invention, when a compound is a salt, the salt dissociates into ions in an ink, but such a case is expressed as "containing a salt" for convenience. An aqueous ink for ink jet may be simply called "ink". Physical property values are values determined at normal temperature (25° C.) unless otherwise noted.

The inventors of the present invention have studied the constitution of a urethane resin to be contained in the ink that enables the recording of images having higher glossiness. The study has revealed that the glossiness of images can be improved by using a urethane resin satisfying the following requirements (1) and (2).

(1) Having a unit derived from a polyisocyanate, a unit derived from a polyether polyol having no acid group and a unit derived from a polyol having an acid group.

(2) Having a weight-average molecular weight of 20,000 or less and an acid value of 50 mg KOH/g or more to 110 mg KOH/g or less.

A urethane resin having a weight-average molecular weight of 20,000 or less has a sterically compact structure, is not left too much on a surface of a recording medium, and thus can reduce the unevenness formed by overlapping dots. In addition, it is supposed that an appropriate amount of a urethane resin on a recording medium exhibits high surface energy to improve the leveling properties of dots.

It has, however, been found that when an aqueous ink containing a copper phthalocyanine pigment as a coloring material and containing a urethane resin satisfying the requirements (1) and (2) is ejected from a recording head that uses thermal energy, the ejection speed is likely to be reduced. When the ejection speed is reduced, an ink is difficult to adhere to a primarily intended position, and the ink ejection stability deteriorates unfortunately. In a recording head having a lower ink ejection stability, a urethane resin or kogation adhered to a heater was observed, and this is considered to be the cause of the reduction in ejection speed.

As the result of studies, the inventors of the present invention have found that when a urethane resin containing a certain proportion of a urea bond derived from a polyamine is used, the ejection speed is unlikely to be reduced, and the ink ejection stability is improved. Specifically, it has been found that by using a urethane resin in which the proportion of the urethane bond relative to the total amount of the urethane bond and the urea bond derived from a polyamine is 90.0% by mole or more to 99.0% by mole or less, the ejection speed is unlikely to be reduced. The inventors of the present invention suggest the following mechanisms for the reason why the ink ejection speed is not reduced and the ejection stability is improved when such a urethane resin is used.

The moiety of N—C=N in the phthalocyanine ring constituting a copper phthalocyanine pigment interacts with the urea bond moiety (—NH—C(=O)—NH—) derived from a polyamine in a urethane resin, and the urethane resin adsorbs to the copper phthalocyanine pigment. It is supposed that this suppresses the adsorption of the pigment and the urethane resin to the heater of a recording head or suppresses the formation of kogation, and thus the ink ejection speed is not reduced but can be maintained. The unit derived from a polyamine has a plurality of urea bonds, and thus the absorption power of the urethane resin to the copper phthalocyanine pigment is comparatively strong. It is also supposed that the urethane resin has a comparatively small weight-average molecular weight of 20,000 or less, thus the adsorption is dominant over the steric hindrance, and the urethane resin can satisfactory adsorb to the copper phthalocyanine pigment.

When the proportion of the urethane bond relative to the total amount of the urethane bond and the urea bond is less than 90.0% by mole, the proportion of the urea bond is excessively large, and thus the hydrophobic moiety of the urethane resin has an excessively high adsorption power. Hence, the urethane resin is likely to adsorb also to the heater of a recording head, thus the ink ejection speed is reduced, and the ejection stability becomes insufficient. When the proportion of the urethane bond relative to the total amount of the urethane bond and the urea bond is more than 99.0% by mole, the proportion of the urea bond is excessively small, and thus the urethane resin has an excessively low adsorption power to the copper phthalocyanine pigment. Hence, the copper phthalocyanine pigment or the like is likely to adsorb to the heater of a recording head to form kogation, thus the ink ejection speed is reduced, and the ejection stability becomes insufficient. In other words, by using a urethane resin having a small number of urea bonds, the present invention achieves the effect of suppressing the deterioration of the ejection stability.

<Ink>

The ink of the present invention is an aqueous ink that is used in an ink jet recording method using thermal energy to eject an ink from a recording head and contains a copper phthalocyanine pigment and a urethane resin. The urethane resin has a unit derived from a polyisocyanate, a unit derived from a polyether polyol having no acid group, a unit derived from a polyol having an acid group and a unit derived from a polyamine. Components contained in the ink of the present invention and the like will next be described in detail.

(Copper Phthalocyanine Pigment)

Examples of the copper phthalocyanine pigment include C.I. Pigment Blues 15, 15:1, 15:3, 15:4 and 15:6. These copper phthalocyanine pigments can be used singly or in combination of two or more of them. The dispersion method of the copper phthalocyanine pigment may be any system including a self-dispersion type requiring no dispersant and a resin dispersion type using a resin dispersant. In order to further improve the image glossiness and the ink ejection stability, it is preferred to use a resin-dispersed pigment using a resin other than the urethane resin (for example, an acrylic resin) as a dispersant or to use a self-dispersible pigment requiring no dispersant. A resin-dispersed pigment, which is likely to improve the image glossiness, is particularly preferably used.

The content (% by mass) of the copper phthalocyanine pigment in the ink is preferably 0.5% by mass or more to 10.0% by mass or less and more preferably 1.0% by mass or more to 10.0% by mass or less based on the total mass of the ink. The content (% by mass) of the urethane resin based on the total mass of the ink relative to the content (% by mass) of the copper phthalocyanine pigment is preferably 0.10 times or more to 1.00 time or less in terms of mass ratio. When the mass ratio is less than 0.10 times, high-level ejection stability and image glossiness may not be sufficiently achieved. When the mass ratio is more than 1.00 time, high-level image glossiness may not be sufficiently achieved.

(Urethane Resin)

The urethane resin used in the ink of the present invention has a unit derived from a polyisocyanate, a unit derived from a polyether polyol having no acid group, a unit derived from a polyol having an acid group and a unit derived from a polyamine. The "unit" in the urethane resin in the present invention means a repeating unit derived from a single monomer.

The content (% by mass) of the urethane resin in the ink is preferably 0.1% by mass or more to 10.0% by mass or less and more preferably 0.5% by mass or more to 3.0% by mass or less based on the total mass of the ink. When the content of the urethane resin is less than 0.1% by mass, high-level ejection stability may not be sufficiently achieved. When the content of the urethane resin is more than 10.0% by mass, high-level glossiness may not be sufficiently achieved.

The urethane resin has a weight-average molecular weight of 20,000 or less and preferably 10,000 or more that are determined by gel permeation chromatography (GPC) in terms of polystyrene. When a urethane resin has a weight-average molecular weight of more than 20,000, the urethane resin is difficult to be stably present in an ink, thus the ink ejection stability may become insufficient, and the image glossiness may also deteriorate.

The urethane resin has an acid value of 50 mg KOH/g or more to 110 mg KOH/g or less. When a urethane resin has an acid value of less than 50 mg KOH/g, the urethane resin is difficult to be stably present in an ink, thus the ink ejection stability becomes insufficient, and the image glossiness also becomes insufficient. When a urethane resin has an acid value of more than 110 mg KOH/g, the urethane resin has an excessively high hydrophilicity, and thus the absorption power of the urethane resin to the copper phthalocyanine pigment is reduced. Hence, the copper phthalocyanine pigment or the like is likely to form kogation on the heater of a recording head, thus the ink ejection speed is reduced, and the ejection stability becomes insufficient. In addition, the glossiness also deteriorates in some cases.

[Proportion of Urethane Bond]

In the urethane resin, the proportion of the urethane bond relative to the total amount of the urethane bond and the urea bond derived from a polyamine is 90.0% by mole or more to 99.0% by mole or less. When the proportion of the urethane bond is less than 90.0% by mole, the proportion of the urea bond derived from a polyamine is excessively large, and thus the hydrophobic moiety of the urethane resin has an excessively high adsorption power. Hence, the urethane resin itself is likely to adsorb to the heater of a recording head, thus the ink ejection speed is reduced, and the ejection stability becomes insufficient. In addition, the image glossiness is also slightly reduced in some cases. When the proportion of the urethane bond is more than 99.0% by mole, the proportion of the urea bond is excessively small, and thus the urethane resin has an excessively low adsorption power to the copper phthalocyanine pigment. Hence, the copper phthalocyanine pigment or the like is likely to adsorb to the heater of a recording head to form kogation, thus the ink ejection speed is reduced, and the ejection stability becomes insufficient.

In the urethane resin, the proportion of the urea bond derived from a polyamine relative to the total amount of the urea bond is preferably 95.0% by mole or more and more preferably 100.0% by mole. The urea bond can be formed by the reaction of a polyisocyanate and water in addition to the reaction of a polyisocyanate and a polyamine. In other words, the urethane resin may contain only a few number of the urea bonds derived from a polyamine, but the urea bond derived from water is preferably reduced as much as possible.

The method of controlling the proportion of the urethane bond in the urethane resin can be exemplified by a method of controlling the amount of a polyamine to be reacted with a polyisocyanate in the production of the urethane resin. In the method, the amount of the urea bond formed by the reaction of a polyamine and an isocyanate group is controlled. Specifically, a plurality of urethane resins are synthesized by changing the amount of a polyamine, first. The proportion (% by mole) of the urethane bond in each urethane resin synthesized is then calculated by the method described later. From the relation between the calculated proportion (% by mole) of the urethane bond and the amount of the polyamine, a calibration curve is prepared. The prepared calibration curve is used to determine the amount of the polyamine required to produce a urethane resin having an intended proportion (% by mole) of a urethane bond. Even when a similar type of a polyamine is used but other components are different types, the reaction rate or the like may vary, and the proportion of the urethane bond in a resulting urethane resin is not necessarily constant. By previously prepare a calibration curve, a urethane resin having an intended urethane bond proportion (% by mole) can be produced.

[Form of Urethane Resin]

The urethane resin may be a resin that is dissolved in an aqueous medium included in the ink to be present in the form with no particle size (water-soluble urethane resin) or may be a resin that is dispersed in an aqueous medium included in the ink to be present in the form with a particle size (water-dispersible urethane resin). A water-insoluble urethane resin is present in the ink in the form of resin particles. In the present invention, a water-soluble urethane resin is preferably used.

Whether a urethane resin is "water-soluble" or "water-dispersible" can be determined by the following procedure. First, a liquid (resin solid content: 10% by mass) containing a urethane resin that is neutralized with an alkali (sodium hydroxide or potassium hydroxide, for example) in an amount corresponding to the acid value is prepared. Next, the prepared liquid is diluted 10-fold (in terms of volume) with pure water to prepare a sample solution. The particle size of the resin in the sample solution is then determined by dynamic light scattering. When particles having particle sizes are observed, such a urethane resin can be determined to be "water-dispersible". The conditions for the measurement can be as follows, for example: SetZero: 30 seconds; number of measurement times: 3; measurement time: 180 seconds; shape: spherical; and refractive index: 1.59. As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions and the like are not limited to the above.

[Polyisocyanate]

A polyisocyanate is the compound having two or more isocyanate groups in the molecular structure thereof. Examples of the polyisocyanate include aliphatic polyisocyanates and aromatic polyisocyanates. The proportion of the unit derived from a polyisocyanate relative to the urethane resin (% by mole) is preferably 10.0% by mole or more to 80.0% by mole or less and more preferably 20.0% by mole or more to 60.0% by mole or less. The proportion of the unit derived from a polyisocyanate relative to the urethane resin (% by mass) is preferably 10.0% by mass or more to 80.0% by mass or less.

Examples of the aliphatic polyisocyanate include polyisocyanates having a chain structure, such as tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate and 3-methylpentane-1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate and 1,3-bis(isocyanate methyl) cyclohexane.

Examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate and α,α,α',α'-tetramethylxylylene diisocyanate.

Of the above polyisocyanates, a polyisocyanate having a cyclic structure is preferably used. Of the polyisocyanates having a cyclic structure, isophorone diisocyanate is more preferably used. The polyisocyanates can be used singly or in combination of two or more of them, but in the present invention, only a single polyisocyanate is particularly preferably used.

[Polyol, Polyamine]

A polyol is the compound having two or more hydroxy groups in the molecular structure thereof. Examples of the polyol include polyols having no acid group, such as polyether polyols, polyester polyols and polycarbonate polyols; and polyols having an acid group. The urethane resin used in the ink of the present invention at least has a unit derived from a polyether polyol having no acid group of the above polyols. A polyamine is the compound having two or more "amino groups or imino groups" in the molecular structure thereof. The proportion of the units derived from a polyol and a polyamine (% by mole) relative to the urethane resin is preferably 10.0% by mole or more to 80.0% by mole or less and more preferably 20.0% by mole or more to 60.0% by mole or less.

[Polyether Polyol Having No Acid Group]

As a component to be reacted with a polyisocyanate to form a urethane bond and to give a unit included in the urethane resin, a polyether polyol having no acid group is used.

Examples of the polyether polyol having no acid group include addition polymers of an alkylene oxide and a polyol; and glycols such as (poly)alkylene glycols. Examples of the alkylene oxide include ethylene oxide, propylene oxide, butylene oxide and α-olefin oxides. Examples of the polyol to be subjected to addition polymerization with an alkylene oxide include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea and derivatives thereof: and triols such as glycerol, trimethylolpropane, 1,2,5-hexanetriol, 1,2,6-hexanetriol, pentaerythritol, trimethylolmelamine and derivatives thereof and polyoxypropylene triol. Examples of the glycol include (poly)alkylene glycols such as tetramethylene glycol, hexamethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol and neopentyl glycol; and ethylene glycol-propylene glycol copolymers.

As the polyether polyol having no acid group, polyethylene glycol, polytetramethylene glycol and polypropylene glycol are preferred, and polypropylene glycol is more preferred. When such a polyether polyol having no acid group is used, the image glossiness and the ink ejection stability can be further improved.

In the urethane resin, the proportion of the unit derived from the above preferred polyether polyol having no acid group relative to the total amount of the unit derived from polyether polyols having no acid group is preferably 80.0% by mole or more to 100.0% by mole or less. The polyether polyol having no acid group preferably has a number-average molecular weight of 400 or more to 4,000 or less determined by gel permeation chromatography (GPC) in terms of polystyrene.

[Polyol Having an Acid Group]

Examples of the polyol having an acid group include polyols having an acid group such as a carboxylic acid group, a sulfonic acid group, a phosphoric acid group and a phosphonic acid group. The acid group is preferably a carboxylic acid group. Examples of the polyol having a carboxylic acid group include dimethylolacetic acid, dimethylolpropionic acid, dimethylolbutanoic acid and dimethylolbutyric acid. Of them, dimethylolpropionic acid and dimethylolbutanoic acid are preferred. The acid group of the polyol having an acid group may be in a salt form. Examples of the cation forming a salt include ions of alkali metals such as lithium, sodium and potassium, an ammonium ion and cations of organic amines such as dimethylamine. The molecular weight of a general-purpose polyol having an acid group is at most about 400, and thus the unit derived from a polyol having an acid group basically constitutes a hard segment of a urethane resin. The acid value of the urethane resin can be controlled by the amount of an acid group-containing diol. The acid group in the urethane resin is mainly derived from the acid group of the unit derived from a polyol having an acid group. The acid value of a urethane resin used in the ink of the present invention can be controlled by the amount of a polyol having an acid group, for example.

In the urethane resin, the proportion of the unit derived from a polyol having an acid group (% by mole) relative to the total amount of the unit derived from a polyol is preferably within the following range. In other words, the proportion is preferably 30.0% by mole or more to 90.0% by mole or less and more preferably 50.0% by mole or more to 90.0% by mole or less.

[Polyamine]

Examples of the polyamine include monoamines having a plurality of hydroxy groups, such as dimethylolethylamine, diethanolmethylamine, dipropanolethylamine and dibutanolmethylamine; bifunctional polyamines such as ethylenediamine, propylenediamine, hexylenediamine, isophoronediamine, xylylenediamine, diphenylmethanediamine, hydrogenated diphenylmethane diamine and hydrazine; and three or more functional polyamines such as diethylenetriamine, triethylenetetramine, tetraethylenepentamine, polyamide polyamine and polyethylene polyimine. For convenience, compounds having a plurality of hydroxy groups and a single "amino group or imino group" are also exemplified as the "polyamine". The molecular weight of a polyamine is at most about 400, and thus the unit derived from a polyamine basically constitutes a hard segment of a urethane resin. The proportion of the unit derived from a polyamine (% by mole) relative to the urethane resin is preferably 0.1% by mole or more to 15.0% by mole or less and more preferably 1.0% by mole or more to 10.0% by mole or less.

[Crosslinking Agent, Chain Extender]

To synthesize the urethane resin, a crosslinking agent or a chain extender can be used. Typically, the crosslinking agent is used to synthesize a prepolymer, and the chain extender is used when a previously synthesized prepolymer is subjected to a chain extension reaction. Basically, the crosslinking agent and the chain extender can be appropriately selected from water, polyisocyanates, polyols, polyamines and the like depending on a purpose such as crosslinking and chain extension. As the chain extender, an agent capable of crosslinking a urethane resin can also be used.

[Analytical Method]

(1) The formulation; and (2) the proportion of the urethane bond relative to the total amount of the urethane bond and the urea bond derived from a polyamine of the urethane resin in the ink can be analyzed by the respective methods shown below.

The formulation of a urethane resin can be analyzed by the following method. First, a method of extracting the urethane resin from an ink containing a urethane resin will be described. For example, to a supernatant liquid prepared by centrifugation of an ink at 80,000 rpm, an excess amount of an acid (hydrochloric acid, for example) is added to precipitate a resin. Alternatively, a urethane resin may be separated by drying the above supernatant liquid. Alternatively, an organic solvent that does not dissolve a pigment or an acrylic resin but dissolves a urethane resin (hexane or chloroform, for example) can be used to extract the urethane resin from an ink. Although the urethane resin present in an ink can be analyzed, analysis of the urethane resin extracted from an ink can improve the measurement accuracy, and thus the extraction is preferred.

The separated urethane resin is dried and then dissolved in deuterated dimethyl sulfoxide (deuterated DMSO) to give a sample for measurement. The prepared measurement sample is analyzed by proton nuclear magnetic resonance method ($^1$H-NMR), and from the positions of obtained peaks, the types of a polyisocyanate, a polyether polyol having no acid group, a polyol having an acid group, a polyamine and the like can be identified. From the ratio of integrated values of peaks at chemical shifts of corresponding components, the composition ratio can also be calculated. Alternatively, pyrolysis gas chromatographic analysis of a urethane resin also enables identification of the types of a polyisocyanate, a polyether polyol having no acid group, a polyol having an acid group, a polyamine and the like. In addition, by the analysis by carbon nuclear magnetic resonance method ($^{13}$C-NMR), the repetition number of units derived from a polyether polyol having no acid group is determined, and the number-average molecular weight can be calculated.

In the urethane resin, the proportion of the urethane bond relative to the total amount of the urethane bond and the urea bond derived from a polyamine can be analyzed by the following method. In other words, a urethane resin is dissolved in deuterated dimethyl sulfoxide to give a sample for measurement. The prepared sample was analyzed by carbon nuclear magnetic resonance method ($^{13}$C-NMR), and from the obtained integrated values of the peaks of the urethane bond and the urea bond derived from a polyamine, the proportion of the urethane bond in the urethane resin can be calculated. However, the positions of the peaks of the urethane bond and the urea bond derived from a polyamine vary with the type of a compound used for preparation of the urethane resin. On this account, for each compound used to synthesize the urethane resin, the peak positions of the urethane bond and the urea bond derived from a polyamine are required to be identified. The method will next be described.

First, the formulation of a urethane resin, specifically, a polyisocyanate and components to be reacted with the polyisocyanate (a polyol having no acid group, a polyol having an acid group and the like), is analyzed. The formulation of a urethane resin can be analyzed by the method described later. Next, in order to assign the chemical shifts of a urethane bond and a urea bond corresponding to a polyisocyanate, the following procedure is performed. A polyisocyanate and each of the components to be reacted with the polyisocyanate (a polyether polyol having no acid group, a diol having an acid group, a polyamine, water) are used to prepare a reaction product. For example, it is assumed that a polyether polyol and a polyol having an acid group are used in combination. In such a case, (i) a reaction product of the polyisocyanate and the polyether polyol, (ii) a reaction product of the polyisocyanate and the polyol having an acid group and (iii) a reaction product of the polyisocyanate and water are prepared. Each reaction product prepared as above is dissolved in deuterated dimethyl sulfoxide and analyzed by carbon nuclear magnetic resonance method ($^{13}$C-NMR) to assign the chemical shifts of the urethane bond and the urea bond of each reaction product.

In the above case, from the reaction product (i) and the reaction product (ii), the chemical shifts of the urethane bonds are identified, and from the reaction product (iii), the chemical shift of the urea bond derived from a polyamine is identified. From the assigned chemical shifts, the peaks of the urethane bonds and the peak of the urea bond are identified, and from the ratio of the integrated values of these peaks, the proportion of the urethane bond relative to the total amount of the urethane bond and the urea bond in the urethane resin is calculated. For example, in the case of a urethane resin prepared from isophorone diisocyanate, the peak of the urethane bond is detected around 155 ppm, which may slightly vary depending on measurement conditions or the formulation of a urethane resin. The peak of the urea bond derived from a polyamine is detected around 159 ppm. The peak of the urea bond derived from water is detected around 158 ppm.

In the examples described later, the proportion of the urethane bond relative to the total amount of the urethane bond and the urea bond in a urethane resin was calculated by the following procedure. To the liquid containing a prepared urethane resin, an excess amount of an acid (hydrochloric acid) was added, and the precipitated urethane resin was separated and dried. The dried urethane resin was dissolved in deuterated dimethyl sulfoxide, and the prepared sample was analyzed by carbon nuclear magnetic resonance method ($^{13}$C-NMR) to determine the integrated values of the peaks of the urethane bond and the urea bond. The $^{13}$C-NMR analysis was performed by using a nuclear magnetic resonance apparatus (trade name "Avance500", manufactured by BRUKER Bio Spin). From the ratio of the integrated values of these peaks, the proportion of the urethane bond relative to the total amount of the urethane bond and the urea bond in the urethane resin was calculated.

(Aqueous Medium)

The ink of the present invention is an aqueous ink containing an aqueous medium including water. As the water, deionized water (ion-exchanged water) is preferably used. The content (% by mass) of water in the ink is preferably 10.0% by mass or more to 90.0% by mass or less and more preferably 50.0% by mass or more to 90.0% by mass or less based on the total mass of the ink.

The aqueous medium may further contain a water-soluble organic solvent. The water-soluble organic solvent may be any water-soluble solvent, and a monohydric alcohol, a polyhydric alcohol, a (poly)alkylene glycol, a glycol ether, a nitrogen-containing polar solvent, a sulfur-containing polar solvent or the like can be used. The content (% by mass) of the water-soluble organic solvent in the ink is preferably 3.0% by mass or more to 50.0% by mass or less based on the total mass of the ink.

The ink of the present invention more preferably contains any alkanolamine of diethanolamine, diisopropanolamine, triethanolamine and triisopropanolamine. These alkanolamines can be used singly or in combination of two or more of them. Specifically, triethanolamine is preferably used. When the ink adheres to a recording medium, the cohesive power of a pigment in dots is reduced due to the buffer capacity of the amine, and the leveling properties of dots are improved. This can further improve the image glossiness.

(Other Additives)

The ink of the present invention can also contain water-soluble organic compounds that are solid at normal temperature, including polyhydric alcohols such as trimethylolpropane and trimethylolethane and urea derivatives such as urea and ethylene urea, as necessary, in addition to the above-mentioned components. The ink of the present invention may further contain various additives such as a surfactant, a pH adjuster, an anticorrosive, an antiseptic agent, an antifungal agent, an antioxidant, a reduction inhibitor, an evaporation accelerator, a chelating agent and a water-soluble resin, as needed.

(Physical Properties of Ink)

The ink preferably has a dynamic surface tension of 40 mN/m or less at a lifetime of 10 msec determined by the maximum bubble pressure method. When an ink has a dynamic surface tension of 40 mN/m or less, the wettability to a recording medium is improved to easily give a smooth image, and an image having a higher level of glossiness can be recorded. The dynamic surface tension of an ink can be easily controlled by appropriately selecting the amount or the type of a highly permeable water-soluble organic solvent or a surfactant. The ink preferably has a dynamic surface tension of 30 mN/m or more and more preferably 35 mN/m or more.

The maximum bubble pressure method is a method in which a maximum pressure required for discharging a bubble formed at a tip of a probe (capillary) immersed in a liquid to be measured is determined and from the maximum pressure, the surface tension of the liquid is determined. The maximum pressure is measured while bubbles are continuously formed at the tip of the probe. In the measurement, the time from a point at which a fresh bubble surface is formed at the tip of a probe to a point at which a maximum bubble pressure is obtained (a point at which the curvature radius of a bubble becomes the same as the radius of the tip of the probe) is called lifetime. The dynamic surface tension of an ink is a value determined at 25° C.

The ink preferably has a pH of 5.0 or more to 10.0 or less and more preferably 7.0 or more to 9.5 or less at 25° C. The ink preferably has a static surface tension of 30 mN/m or more to 45 mN/m or less at 25° C. The ink preferably has a viscosity of 1.0 mPa·s or more to 5.0 mPa·s or less at 25° C.

<Ink Cartridge>

An ink cartridge of the present invention includes an ink and an ink storage portion storing the ink. The ink stored in the ink storage portion is the ink of the present invention described above. FIG. 1 is a schematic sectional view showing an embodiment of the ink cartridge of the present invention. As shown in FIG. 1, the bottom face of the ink cartridge has an ink supply port 12 for supplying the ink to a recording head. The inside of the ink cartridge is an ink storage portion for storing the ink. The ink storage portion includes an ink storage chamber 14 and an absorber storage chamber 16, and the ink storage chamber 14 and the absorber storage chamber 16 communicate with each other through a communication hole 18. The absorber storage chamber 16 communicates with the ink supply port 12. The ink storage chamber 14 stores a liquid ink 20. The absorber storage chamber 16 stores absorbers 22 and 24 that are impregnated with the ink to hold the ink. The ink storage portion does not necessarily have the ink storage chamber that stores a liquid ink, and can be a portion in which all the ink stored is held by absorbers. The ink storage portion does not necessarily have absorbers, and can be a portion that stores all the ink in a liquid state. The ink storage portion may be integrated with a recording head to form an ink cartridge.

<Ink Jet Recording Method>

An ink jet recording method of the present invention is a method in which the above-described ink of the present invention is ejected from an ink jet recording head to record an image on a recording medium. The system for ejecting an ink is a system of applying thermal energy to an ink. The ink jet recording method can include any known steps as long as the ink of the present invention is used.

Figure 2A:
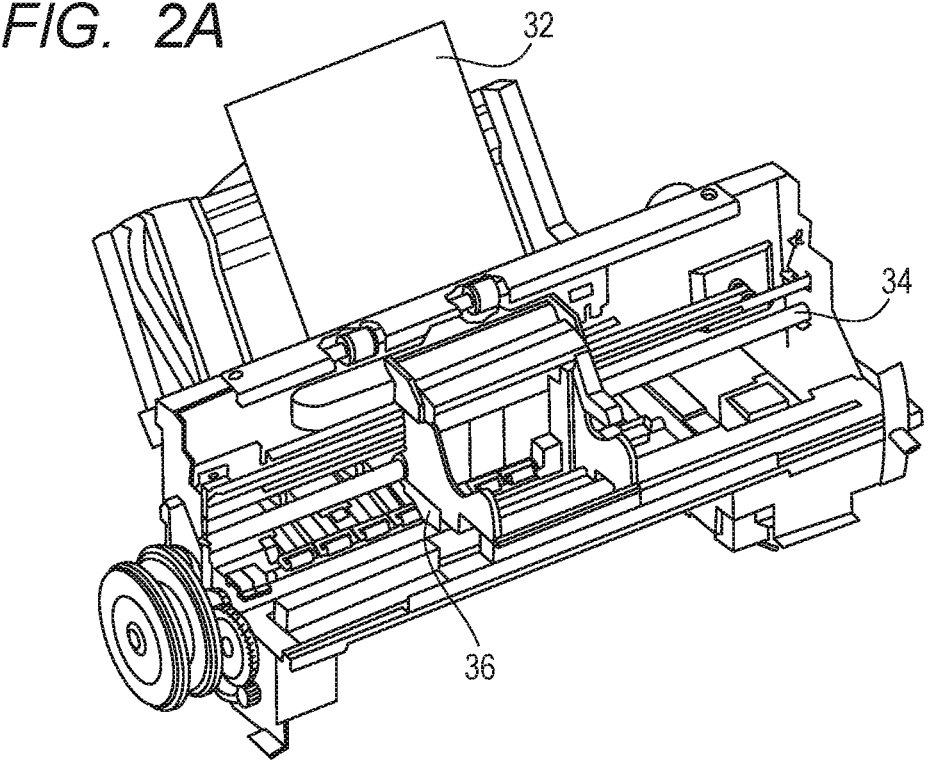
FIGS. 2A and 2B are schematic views showing an exemplary ink jet recording apparatus used for an ink jet recording method of the present invention.
Figure 2B:
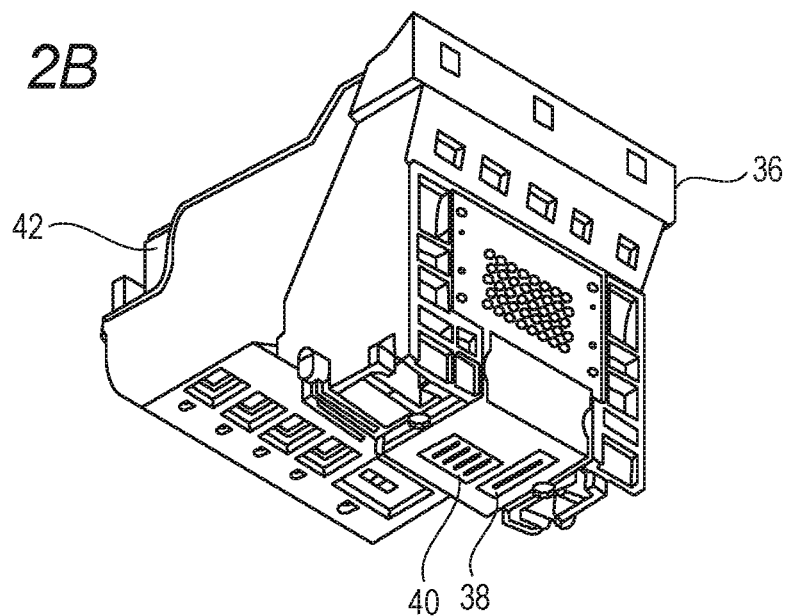

FIGS. 2A and 2B are schematic views showing an exemplary ink jet recording apparatus used for the ink jet recording method of the present invention; FIG. 2A is a perspective view of a principal part of the ink jet recording apparatus; and FIG. 2B is a perspective view of a head cartridge. The ink jet recording apparatus includes a conveyance unit (not shown) for conveying a recording medium 32 and a carriage shaft 34. On the carriage shaft 34, a head cartridge 36 can be installed. The head cartridge 36 includes recording heads 38 and 40 and is so constructed that an ink cartridge 42 can be set. Inks (not shown) are ejected toward the recording medium 32 from the recording heads 38 and 40 while the head cartridge 36 is being carried in a main scanning direction along the carriage shaft 34. The recording medium 32 is then conveyed in a sub scanning direction by a conveyance unit (not shown), whereby an image is recorded on the recording medium 32. The object recording medium to be recorded by using the ink of the present invention may be any recording medium but is preferably a recording medium including a recording medium having no coating layer (plain paper, for example) and a recording medium having a coating layer (glossy paper and art paper).

EXAMPLES

The present invention will next be described in further detail with reference to examples, comparative examples and reference examples, but the invention is not intended to be limited to the following examples without departing from the scope of the invention. The component amounts with "part" or "%" are based on mass unless otherwise noted.

<Synthesis of Urethane Resin>

A four-necked flask equipped with a stirrer, a thermometer, a nitrogen gas inlet tube and a reflux condenser was prepared. In the four-necked flask, a polyisocyanate, a polyol having no acid group and a polyol having an acid group in types and amounts shown in Table 1, 0.02 parts of dibutyltin dilaurate and 120.0 parts of methyl ethyl ketone were placed. The mixture was then reacted at 80° C. for 6 hours in a nitrogen gas atmosphere. Next, a polyamine in an amount shown in Table 1 was added, and the mixture was reacted at 80° C. until the product obtained a predetermined weight-average molecular weight, giving a reaction liquid. The resulting reaction liquid was cooled to 40° C., then ion-exchanged water was added, and an aqueous potassium hydroxide solution was added while the mixture was stirred at a high speed with a homomixer, giving a liquid. From the resulting liquid, methyl ethyl ketone was distilled off under heat and reduced pressure, giving a liquid containing one of water-soluble urethane resins 1 to 23 at a urethane resin content (solid content) of 20.0%. The components in Table 1 are shown below in detail.

IPDI: isophorone diisocyanate
HDI: hexamethylene diisocyanate
PPG: polypropylene glycol (number-average molecular weight: 2,000)
PEG: polyethylene glycol (number-average molecular weight: 2,000)
PTMG: polytetramethylene glycol (number-average molecular weight: 2,000)
DMPA: dimethylolpropionic acid
DMBA: dimethylolbutanoic acid
EDA: ethylenediamine
DETA: diethylenetriamine
TMP: trimethylolpropane
NPG: neopentyl glycol

TABLE 1

Synthetic conditions and properties of urethane resins

| | Synthetic conditions | | | | | | | | | | Properties | | |
|---|---|---|---|---|---|---|---|---|---|---|---|---|---|
| | Polyisocyanate | | Polyol having no acid group | | Polyol having an acid group | | Polyamine | | Crosslinking agent | | Weight-average molecular weight | Acid value (mgKOH/g) | Proportion of urethane bond (% by mole) |
| Urethane resin | Type | Amount (parts) | Type | Amount (parts) | Type | Amount (parts) | Type | Amount (parts) | Type | Amount (parts) | | | |
| 1 | IPDI | 31.2 | PPG | 35.9 | DMPA | 12.7 | EDA | 0.3 | | | 15,000 | 65 | 97.0 |
| 2 | HDI | 23.6 | PPG | 35.9 | DMPA | 12.7 | EDA | 0.3 | | | 15,000 | 65 | 97.0 |
| 3 | IPDI | 31.2 | PPG | 35.9 | DMBA | 14.0 | EDA | 0.3 | | | 15,000 | 65 | 97.0 |
| 4 | IPDI | 31.2 | PPG | 35.9 | DMPA | 12.7 | DETA | 0.3 | | | 15,000 | 65 | 97.0 |
| 5 | IPDI | 31.2 | PPG | 35.9 | DMPA | 12.7 | EDA | 0.9 | | | 15,000 | 65 | 90.0 |
| 6 | IPDI | 31.2 | PPG | 35.9 | DMPA | 12.7 | EDA | 0.1 | | | 15,000 | 65 | 99.0 |
| 7 | IPDI | 31.2 | PPG | 35.9 | DMPA | 12.7 | EDA | 0.3 | | | 20,000 | 65 | 97.0 |
| 8 | IPDI | 29.0 | PPG | 39.3 | DMPA | 9.3 | EDA | 0.2 | | | 15,000 | 50 | 97.0 |
| 9 | IPDI | 29.0 | PPG | 39.3 | DMPA | 24.5 | EDA | 0.2 | | | 15,000 | 110 | 97.0 |
| 10 | IPDI | 31.2 | PEG | 35.9 | DMPA | 12.7 | EDA | 0.3 | | | 15,000 | 65 | 97.0 |
| 11 | IPDI | 31.2 | PTMG | 35.9 | DMPA | 12.7 | EDA | 0.3 | | | 15,000 | 65 | 97.0 |
| 12 | IPDI | 31.2 | PPG | 35.9 | DMPA | 12.7 | EDA | 1.0 | | | 15,000 | 65 | 88.0 |
| 13 | IPDI | 31.2 | PPG | 35.9 | DMPA | 12.7 | EDA | 0.1 | | | 15,000 | 65 | 99.5 |
| 14 | IPDI | 31.2 | PPG | 35.9 | DMPA | 12.7 | EDA | 0.3 | | | 22,000 | 65 | 97.0 |
| 15 | IPDI | 29.0 | PPG | 38.9 | DMPA | 7.2 | EDA | 0.2 | | | 15,000 | 40 | 97.0 |
| 16 | IPDI | 29.0 | PPG | 39.3 | DMPA | 27.6 | EDA | 0.2 | | | 15,000 | 120 | 97.0 |
| 17 | IPDI | 31.2 | PPG | 35.9 | DMPA | 12.7 | EDA | 0.8 | | | 30,000 | 65 | 91.0 |
| 18 | IPDI | 31.2 | PTMG | 35.9 | DMPA | 12.7 | EDA | 1.0 | | | 15,000 | 65 | 88.0 |
| 19 | IPDI | 31.2 | PTMG | 35.9 | DMPA | 12.7 | | | NPG | 3.0 | 33,000 | 65 | 100.0 |
| 20 | IPDI HDI | 31.6 23.9 | PPG | 115.0 | DMPA | 28.7 | EDA | 0.8 | | | 30,000 | 60 | 95.0 |
| 21 | IPDI | 31.2 | PPG | 35.9 | DMPA | 12.7 | EDA | 1.4 | | | 30,000 | 65 | 83.0 |
| 22 | IPDI | 31.2 | PPG | 35.9 | DMPA | 12.7 | | | TMP | 3.8 | 35,000 | 65 | 100.0 |
| 23 | IPDI HDI | 32.0 24.2 | PPG | 111.2 | DMPA | 28.7 | | | TMP | 3.8 | 35,000 | 60 | 100.0 |

<Properties of Urethane Resin>

Various physical property values of the prepared urethane resins were determined by the following methods. Hydrochloric acid was added to a liquid containing a urethane resin to precipitate the urethane resin. The resin dried under vacuum at 40° C. overnight was dissolved in tetrahydrofuran to prepare a sample. The sample was subjected to potentiometric titration using a potassium hydroxide-methanol titration solution to determine the acid value of the urethane resin. The weight-average molecular weight of the urethane resin was determined by gel permeation chromatography).

Hydrochloric acid was added to a liquid containing a urethane resin to precipitate the urethane resin. The dried resin was dissolved in deuterated DMSO to prepare a measurement sample. The prepared sample was analyzed by $^{13}$C-NMR (apparatus name "Avance500", manufactured by BRUKER Bio Spin), and from the obtained integrated values of the peaks of the urethane bond and the urea bond derived from a polyamine, the proportion of the urethane bond in the urethane resin was calculated (shown as "proportion of urethane bond (% by mole)" in Table 1).

<Preparation of Pigment Dispersion Liquid>

(Pigment Dispersion Liquid 1)

First, 10.0 parts of C.I. Pigment Blue 15:3, 3.0 parts of a resin dispersant (solid content) and 87.0 parts of water were mixed. The mixture was dispersed with a sand grinder for 1 hour, and then was centrifuged to remove non-dispersed substances including coarse particles. The resin dispersant used was prepared by neutralizing a styrene-acrylic acid copolymer having an acid value of 120 mg KOH/g and a weight-average molecular weight of 7,000, with a 10.0% aqueous potassium hydroxide solution in an equivalent molar amount to the acid value. Next, the product was subjected to pressure filtration through a microfilter with a pore size of 3.0 μm (manufactured by Fujifilm Corporation), giving a pigment dispersion liquid 1. In the pigment dispersion liquid 1, the pigment content was 10.0%, and the resin content was 3.0%.

(Pigment Dispersion Liquid 2)

A solution prepared by dissolving 5 g of concentrated hydrochloric acid in 5.5 g of water was cooled to 5° C., and 1.5 g of p-aminobenzoic acid was added. A container containing the solution was placed in an ice bath to cool to 10° C. or less, and a solution prepared by dissolving 1.8 g of sodium nitrite in 9.0 g of water at 5° C. was added. After stirring for 15 minutes, 6.0 g of C.I. Pigment Blue 15:3 having a specific surface area of 90 m$^2$/g was added under stirring, and the whole was further stirred for 15 minutes, giving a slurry. The obtained slurry was filtered through a filter paper (trade name "Standard filter paper No. 2", manufactured by ADVANTEC), and then the obtained particles were thoroughly washed with water. The water-washed particles were dried in an oven at 110° C., giving a self-dispersible pigment. To the obtained self-dispersible pigment, water was added so as to give a pigment content of 10.0%, giving a pigment dispersion liquid 2 in which a self-dispersible pigment containing the C.I. Pigment Blue 15:3 having the particle surface to which a —C$_6$H$_4$—COONa group was bonded was dispersed in water.

(Pigment Dispersion Liquid 3)

The same procedure as the case of the pigment dispersion liquid 1 was performed except that the pigment type was changed to C.I. Pigment Red 122, giving a pigment dispersion liquid 3. In the pigment dispersion liquid 3, the pigment content was 10.0%, and the resin content was 3.0%.

(Pigment Dispersion Liquid 4)

The same procedure as the case of the pigment dispersion liquid 1 was performed except that the pigment type was changed to C.I. Pigment Yellow 74, giving a pigment dispersion liquid 4. In the pigment dispersion liquid 4, the pigment content was 10.0%, and the resin content was 3.0%.

(Pigment Dispersion Liquid 5)

The same procedure as the case of the pigment dispersion liquid 1 was performed except that the pigment type was changed to C.I. Pigment Red 254, giving a pigment dispersion liquid 5. In the pigment dispersion liquid 5, the pigment content was 10.0%, and the resin content was 3.0%.

(Pigment Dispersion Liquid 6)

The same procedure as the case of the pigment dispersion liquid 1 was performed except that the pigment type was changed to C.I. Pigment Violet 23, giving a pigment dispersion liquid 6. In the pigment dispersion liquid 6, the pigment content was 10.0%, and the resin content was 3.0%.

(Pigment Dispersion Liquid 7)

The same procedure as the case of the pigment dispersion liquid 1 was performed except that the pigment type was changed to carbon black, giving a pigment dispersion liquid 7. In the pigment dispersion liquid 7, the pigment content was 10.0%, and the resin content was 3.0%.

<Preparation of Ink>

Components (unit: %) shown in upper rows in Tables 2-1 to 2-2 were mixed and thoroughly stirred, and the mixtures were subjected to pressure filtration through a microfilter with a pore size of 3.0 μm (manufactured by Fujifilm Corporation), giving inks. The "polyethylene glycol" in Tables 2-1 to 2-2 has a number-average molecular weight of 1,000. The "Acetylenol E100" in Tables 2-1 to 2-2 is the trade name of a nonionic surfactant (acetylene glycol ethylene oxide adduct) manufactured by Kawaken Fine Chemicals. The "NIKKOL BC15" is the trade name of a nonionic surfactant (polyoxyethylene cetyl ether) manufactured by Nikko Chemicals. The dynamic surface tension $\gamma_{10}$ was determined by using a dynamic surface tensiometer (trade name "BUBLE PRESSURE TENSIOMETER BP-2", manufactured by KRUSS) at 25° C. by the maximum bubble pressure method.

TABLE 2

Formulations and properties of inks

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment dispersion liquid type | 1 | 1 | 1 | 1 | 1 | 1 | 1 | 1 | 1 | 2 | 1 |
| Urethane resin type | 1 | 2 | 3 | 4 | 5 | 6 | 7 | 8 | 9 | 1 | 1 |
| Pigment dispersion liquid | 40.00 | 40.00 | 40.00 | 40.00 | 40.00 | 40.00 | 40.00 | 40.00 | 40.00 | 40.00 | 40.00 |
| Liquid containing urethane resin | 5.00 | 5.00 | 5.00 | 5.00 | 5.00 | 5.00 | 5.00 | 5.00 | 5.00 | 5.00 | 1.60 |
| Glycerol | 7.00 | 7.00 | 7.00 | 7.00 | 7.00 | 7.00 | 7.00 | 7.00 | 7.00 | 7.00 | 7.00 |
| 2-Pyrrolidone | 5.00 | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 | 5.00 |
| Diethylene glycol | | | | | | | | | | | |
| 1,2-Hexanediol | 3.00 | 3.00 | 3.00 | 3.00 | 3.00 | 3.00 | 3.00 | 3.00 | 3.00 | 3.00 | 3.00 |
| Polyethylene glycol | 1.00 | 1.00 | 1.00 | 1.00 | 1.00 | 1.00 | 1.00 | 1.00 | 1.00 | 1.00 | 1.00 |
| Triethanolamine | 1.00 | 1.00 | 1.00 | 1.00 | 1.00 | 1.00 | 1.00 | 1.00 | 1.00 | 1.00 | 1.00 |
| Diethanolamine | | | | | | | | | | | |
| Diisopropanolamine | | | | | | | | | | | |
| Triisopropanolamine | | | | | | | | | | | |
| Acetylenol E100 | 0.50 | 0.50 | | 0.50 | 0.50 | 0.50 | 0.50 | 0.50 | 0.50 | 0.50 | 0.50 |
| NIKKOL BC15 | | | 0.20 | | | | | | | | |
| Pure water | 32.50 | 32.50 | 32.80 | 32.50 | 32.50 | 32.50 | 32.50 | 32.50 | 32.50 | 32.50 | 35.90 |
| Dynamic surface tension $\gamma_{10}$ (mN/m) | 37 | 37 | 37 | 37 | 37 | 37 | 37 | 37 | 37 | 37 | 37 |
| Pigment content P (%) | 4.0 | 4.0 | 4.0 | 4.0 | 4.0 | 4.0 | 4.0 | 4.0 | 4.0 | 4.0 | 4.0 |
| Urethane resin content U (%) | 1.0 | 1.0 | 1.0 | 1.0 | 1.0 | 1.0 | 1.0 | 1.0 | 1.0 | 1.0 | 0.3 |
| U/P (times) | 0.25 | 0.25 | 0.25 | 0.25 | 0.25 | 0.25 | 0.25 | 0.25 | 0.25 | 0.25 | 0.08 |

| | Example | | | | | | | | |
|---|---|---|---|---|---|---|---|---|---|
| | 12 | 13 | 14 | 15 | 16 | 17 | 18 | 19 | 20 |
| Pigment dispersion liquid type | 1 | 1 | 1 | 1 | 1 | 1 | 1 | 1 | 1 |
| Urethane resin type | 1 | 1 | 1 | 10 | 11 | 1 | 1 | 1 | 1 |
| Pigment dispersion liquid | 40.00 | 40.00 | 40.00 | 40.00 | 40.00 | 40.00 | 40.00 | 40.00 | 40.00 |
| Liquid containing urethane resin | 2.00 | 20.00 | 22.00 | 5.00 | 5.00 | 5.00 | 5.00 | 5.00 | 5.00 |
| Glycerol | 7.00 | 7.00 | 7.00 | 7.00 | 7.00 | 7.00 | 7.00 | 7.00 | 7.00 |
| 2-Pyrrolidone | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 |
| Diethylene glycol | | | | | | | | | |
| 1,2-Hexanediol | 3.00 | 3.00 | 3.00 | 3.00 | 3.00 | 3.00 | 3.00 | 3.00 | 3.00 |
| Polyethylene glycol | 1.00 | 1.00 | 1.00 | 1.00 | 1.00 | 1.00 | 1.00 | 1.00 | 1.00 |
| Triethanolamine | 1.00 | 1.00 | 1.00 | 1.00 | 1.00 | 1.00 | 1.00 | | |
| Diethanolamine | | | | | | | | | 1.00 |
| Diisopropanolamine | | | | | | | | | |
| Triisopropanolamine | | | | | | | | | |

TABLE 2-continued

| Formulations and properties of inks | | | | | | | | |
|---|---|---|---|---|---|---|---|---|
| Acetylenol E100 | 0.50 | 0.60 | 0.60 | 0.50 | 0.50 | 0.45 | 0.40 | 0.50 | 0.50 |
| NIKKOL BC15 | | | | | | | | | |
| Pure water | 35.50 | 17.40 | 15.40 | 32.50 | 32.50 | 32.55 | 32.60 | 33.50 | 32.50 |
| Dynamic surface tension $\gamma_{10}$ (mN/m) | 37 | 37 | 37 | 37 | 37 | 40 | 42 | 37 | 37 |
| Pigment content P (%) | 4.0 | 4.0 | 4.0 | 4.0 | 4.0 | 4.0 | 4.0 | 4.0 | 4.0 |
| Urethane resin content U (%) | 0.4 | 4.0 | 4.4 | 1.0 | 1.0 | 1.0 | 1.0 | 1.0 | 1.0 |
| U/P (times) | 0.10 | 1.00 | 1.10 | 0.25 | 0.25 | 0.25 | 0.25 | 0.25 | 0.25 |

|  | Example | | | Comparative Example | | | | |
|---|---|---|---|---|---|---|---|---|
|  | 21 | 22 | 23 | 1 | 2 | 3 | 4 | 5 |
| Pigment dispersion liquid type | 1 | 1 | 2 | 1 | 1 | 1 | 1 | 1 |
| Urethane resin type | 1 | 1 | 10 | 12 | 13 | 14 | 15 | 16 |
| Pigment dispersion liquid | 40.00 | 40.00 | 40.00 | 40.00 | 40.00 | 40.00 | 40.00 | 40.00 |
| Liquid containing urethane resin | 5.00 | 5.00 | 22.00 | 5.00 | 5.00 | 5.00 | 5.00 | 5.00 |
| Glycerol | 7.00 | 7.00 | 7.00 | 7.00 | 7.00 | 7.00 | 7.00 | 7.00 |
| 2-Pyrrolidone | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 |
| Diethylene glycol | | | | | | | | |
| 1,2-Hexanediol | 3.00 | 3.00 | 3.00 | 3.00 | 3.00 | 3.00 | 3.00 | 3.00 |
| Polyethylene glycol | 1.00 | 1.00 | 1.00 | 1.00 | 1.00 | 1.00 | 1.00 | 1.00 |
| Triethanolamine | | | | 1.00 | 1.00 | 1.00 | 1.00 | 1.00 |
| Diethanolamine | | | | | | | | |
| Diisopropanolamine | 1.00 | | | | | | | |
| Triisopropanolamine | | 1.00 | | | | | | |
| Acetylenol E100 | 0.50 | 0.50 | 0.45 | 0.50 | 0.50 | 0.50 | 0.50 | 0.50 |
| NIKKOL BC15 | | | | | | | | |
| Pure water | 32.50 | 32.50 | 16.55 | 32.50 | 32.50 | 32.50 | 32.50 | 32.50 |
| Dynamic surface tension $\gamma_{10}$ (mN/m) | 37 | 37 | 42 | 37 | 37 | 37 | 37 | 37 |
| Pigment content P (%) | 4.0 | 4.0 | 4.0 | 4.0 | 4.0 | 4.0 | 4.0 | 4.0 |
| Urethane resin content U (%) | 1.0 | 1.0 | 4.4 | 1.0 | 1.0 | 1.0 | 1.0 | 1.0 |
| U/P (times) | 0.25 | 0.25 | 1.10 | 0.25 | 0.25 | 0.25 | 0.25 | 0.25 |

|  | Comparative Example | | | | Reference Example | | |
|---|---|---|---|---|---|---|---|
|  | 6 | 7 | 8 | 9 | 1 | 2 | 3 |
| Pigment dispersion liquid type | 2 | 1 | 1 | 2 | 3 | 4 | 5 |
| Urethane resin type | 17 | 18 | 19 | 20 | 1 | 1 | 1 |
| Pigment dispersion liquid | 40.00 | 40.00 | 40.00 | 30.00 | 40.00 | 40.00 | 40.00 |
| Liquid containing urethane resin | 1.00 | 5.00 | 10.00 | 7.50 | 5.00 | 5.00 | 5.00 |
| Glycerol | 7.00 | 7.00 | 7.00 | 7.00 | 7.00 | 7.00 | 7.00 |
| 2-Pyrrolidone | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 |
| Diethylene glycol | | | 5.00 | | | | |
| 1,2-Hexanediol | | | | | 3.00 | 3.00 | 3.00 |
| Polyethylene glycol | 1.00 | 1.00 | 1.00 | | 1.00 | 1.00 | 1.00 |
| Triethanolamine | | | | | 1.00 | 1.00 | 1.00 |
| Diethanolamine | | | | | | | |
| Diisopropanolamine | | | | | | | |
| Triisopropanolamine | | | | | | | |
| Acetylenol E100 | 0.60 | 0.60 | 0.80 | 0.50 | 0.50 | 0.50 | 0.50 |
| NIKKOL BC15 | | | | 0.20 | | | |
| Pure water | 40.40 | 36.40 | 26.20 | 44.80 | 32.50 | 32.50 | 32.50 |
| Dynamic surface tension $\gamma_{10}$ (mN/m) | 45 | 45 | 35 | 37 | 37 | 37 | 37 |
| Pigment content P (%) | 4.0 | 4.0 | 4.0 | 3.0 | 4.0 | 4.0 | 4.0 |
| Urethane resin content U (%) | 0.2 | 1.0 | 2.0 | 1.5 | 1.0 | 1.0 | 1.0 |
| U/P (times) | 0.05 | 0.25 | 0.50 | 0.50 | 0.25 | 0.25 | 0.25 |

TABLE 2-continued

Formulations and properties of inks

| | Reference Example | | | | |
|---|---|---|---|---|---|
| | 4 | 5 | 6 | 7 | 8 |
| Pigment dispersion liquid type | 6 | 7 | 7 | 7 | 7 |
| Urethane resin type | 1 | 1 | 21 | 22 | 23 |
| Pigment dispersion liquid | 40.00 | 40.00 | 40.00 | 40.00 | 30.00 |
| Liquid containing urethane resin | 5.00 | 5.00 | 5.00 | 20.00 | 15.00 |
| Glycerol | 7.00 | 7.00 | 7.00 | 7.00 | 9.00 |
| 2-Pyrrolidone | 5.00 | 5.00 | 5.00 | 5.00 | |
| Triethylene glycol | 5.00 | 5.00 | 5.00 | 5.00 | 5.00 |
| Diethylene glycol | | | | | 5.00 |
| 1,2-Hexanediol | 3.00 | 3.00 | 3.00 | 3.00 | |
| Polyethylene glycol | 1.00 | 1.00 | 1.00 | 1.00 | |
| Triethanolamine | 1.00 | 1.00 | | | |
| Diethanolamine | | | | | |
| Diisopropanolamine | | | | | |
| Triisopropanolamine | | | | | |
| Acetylenol E100 | 0.50 | 0.50 | 0.10 | 0.10 | 0.10 |
| NIKKOL BC15 | | | | | |
| Pure water | 32.50 | 32.50 | 33.90 | 18.90 | 35.90 |
| Dynamic surface tension $\gamma_{10}$ (mN/m) | 37 | 37 | 52 | 60 | 50 |
| Pigment content P (%) | 4.0 | 4.0 | 4.0 | 4.0 | 3.0 |
| Urethane resin content U (%) | 1.0 | 1.0 | 1.0 | 4.0 | 3.0 |
| U/P (times) | 0.25 | 0.25 | 0.25 | 1.00 | 1.00 |

<Evaluation>

One of the inks obtained above was filled in an ink cartridge, and the ink cartridge was set in an ink jet recording apparatus equipped with a recording head that ejected an ink by thermal energy (trade name "PIXUS MX7600", manufactured by Canon). The recording apparatus includes a unit for applying a reaction liquid to a recording medium, but was modified to deactivate the unit and used for the evaluation. In the examples, the solid image recorded in conditions in which an ink drop having a mass of 5 ng±10% is applied to a unit area of 1/1,200 inch×1/1,200 inch is defined as a recording duty of 100%. The recording conditions were a temperature of 23° C. and a relative humidity of 55%. In the present invention, "AA", "A" and "B" were regarded as an acceptable level, and "C" was regarded as an unacceptable level based on the following criteria.

(Ejection Stability)

The above ink jet recording apparatus was used to record a transverse line image formed by a single dot width on a plain paper (trade name "GF-500", manufactured by Canon). Next, 1,000 solid images with dimensions of 19 cm×26 cm (recording duty: 100%) were recorded, and then a transverse line image formed by a single dot width was recorded. A personal image quality evaluation system (trade name "Personal IAS", manufactured by Quality Engineering Associates) was used to determine the raggedness value of the edge of each line in the recorded two images. The ink ejection stability was evaluated on the basis of the following criteria.

AA: The raggedness value of a line after recording of solid images increased by less than 2 as compared with the raggedness value of a line before recording of solid images, but the line was not distorted even after recording of solid images.

A: The raggedness value of a line after recording of solid images increased by 2 or more and less than 4 as compared with the raggedness value of a line before recording of solid images, but the line was not distorted even after recording of solid images.

B: The raggedness value of a line after recording of solid images increased by 4 or more and less than 6 as compared with the raggedness value of a line before recording of solid images, and the line was slightly distorted after recording of solid images.

C: The raggedness value of a line after recording of solid images increased by 6 or more as compared with the raggedness value of a line before recording of solid images, and the line was obviously distorted after recording of solid images.

(Glossiness)

The above ink jet recording apparatus was used to record a solid image with a recording duty of 100% on a glossy paper (trade name "Canon Photo Paper, Plus Glossy, GL-101", manufactured by Canon), giving a recorded product. One day after the recording, two fluorescent lamps arranged at an interval of 10 cm were used as observation light sources, and the fluorescent lamps were projected onto the image 2 m apart. The shapes of the fluorescent lamps projected on the image were visually observed in conditions of a lighting angle of 45 degrees and an observation angle of 45 degrees, and the glossiness of the image was evaluated on the basis of the following criteria.

AA: The boundary between two projected fluorescent lamps was observed, and the edges were not blurred.

A: The boundary between two projected fluorescent lamps and the edges were observed, but the edges were slightly blurred.

B: The boundary between two projected fluorescent lamps was observed but was so blurred as not to identify the edges.

C: No boundary between two projected fluorescent lamps was observed.

TABLE 3

Evaluation results

|  |  | Ejection stability | Glossiness |
|---|---|---|---|
| Example | 1 | AA | AA |
|  | 2 | AA | AA |
|  | 3 | AA | AA |
|  | 4 | AA | AA |
|  | 5 | AA | AA |
|  | 6 | AA | AA |
|  | 7 | AA | AA |
|  | 8 | AA | AA |
|  | 9 | AA | AA |
|  | 10 | AA | A |
|  | 11 | A | A |
|  | 12 | AA | AA |
|  | 13 | AA | AA |
|  | 14 | AA | A |
|  | 15 | A | A |
|  | 16 | A | A |
|  | 17 | AA | AA |
|  | 18 | AA | A |
|  | 19 | AA | A |
|  | 20 | AA | AA |
|  | 21 | AA | AA |
|  | 22 | AA | AA |
|  | 23 | B | B |
| Comparative Example | 1 | C | A |
|  | 2 | C | AA |
|  | 3 | C | A |
|  | 4 | C | C |
|  | 5 | C | A |
|  | 6 | C | C |
|  | 7 | C | B |
|  | 8 | C | C |
|  | 9 | C | A |
| Reference Example | 1 | * | AA |
|  | 2 | * | AA |
|  | 3 | * | AA |
|  | 4 | * | AA |
|  | 5 | * | AA |
|  | 6 | * | C |
|  | 7 | * | C |
|  | 8 | * | A |

The evaluation of "ejection stability" in Reference Examples 1 to 8 exhibited no difference as compared with inks in which the urethane resin was removed and was replaced with pure water.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045709, filed Mar. 10, 2017, which is hereby incorporated by reference herein in its entirety.

What is claimed is:

1. An aqueous ink used in an ink jet recording method that uses thermal energy to eject an ink from a recording head, the aqueous ink comprising:
    a copper phthalocyanine pigment; and
    a urethane resin,
    wherein the urethane resin has a unit derived from a polyisocyanate, a unit derived from a polyether polyol having no acid group, a unit derived from a polyol having an acid group and a unit derived from a polyamine,
    wherein, in the urethane resin, a proportion of a urethane bond relative to a total amount of the urethane bond and a urea bond derived from the polyamine is 90.0% by mole or more to 99.0% by mole or less, and
    wherein the urethane resin has a weight-average molecular weight of 20,000 or less and an acid value of 50 mg KOH/g or more to 110 mg KOH/g or less.

2. The aqueous ink according to claim 1, wherein the copper phthalocyanine pigment is a resin-dispersed pigment.

3. The aqueous ink according to claim 1, wherein a content (% by mass) of the urethane resin relative to a content (% by mass) of the copper phthalocyanine pigment in terms of mass ratio is 0.10 times or more to 1.00 times or less.

4. The aqueous ink according to claim 1, wherein the polyether polyol having no acid group is a polypropylene glycol.

5. The aqueous ink according to claim 1, wherein the aqueous ink has a dynamic surface tension of 40 mN/m or less at a lifetime of 10 msec.

6. The aqueous ink according to claim 1, further comprising at least one of diethanolamine, diisopropanolamine, triethanolamine and triisopropanolamine.

7. An ink cartridge comprising:
    an ink; and
    an ink storage portion storing the ink,
    wherein the ink is the aqueous ink according to claim 1.

8. An ink jet recording method comprising:
    ejecting an ink from an ink jet recording head by thermal energy to record an image on a recording medium,
    wherein the ink is the aqueous ink according to claim 1.

* * * * *